United States Patent [19]

Seppänen et al.

[11] Patent Number: 5,692,032

[45] Date of Patent: Nov. 25, 1997

[54] MOBILE TERMINAL HAVING ONE KEY USER MESSAGE ACKNOWLEDGMENT FUNCTION

[75] Inventors: Jorma Seppänen, Oulu; Juha Vaihoja, Tupos; Mikko Lietsalmi; Jaakko Vänttilä, both of Oulu, all of Finland

[73] Assignee: Nokia Mobile Phones Ltd., Salo, Finland

[21] Appl. No.: 562,900

[22] Filed: Nov. 27, 1995

[51] Int. Cl.$^6$ .................................................. H04Q 7/22
[52] U.S. Cl. ............................ 379/59; 455/33.1; 379/58
[58] Field of Search .............................. 379/57, 58, 59, 379/63; 455/33.1, 54.1; 340/825.44, 311.1

[56] References Cited

U.S. PATENT DOCUMENTS

| | | | |
|---|---|---|---|
| 4,644,351 | 2/1987 | Zabarsky et al. | 340/825.44 |
| 4,940,963 | 7/1990 | Gutman et al. | 340/311.1 X |
| 5,153,582 | 10/1992 | Davis | 340/825.44 |
| 5,307,399 | 4/1994 | Dai et al. | 379/57 |
| 5,351,235 | 9/1994 | Lahtinen | 370/58.1 |
| 5,513,241 | 4/1996 | Dmitriadis et al. | 379/57 |

OTHER PUBLICATIONS

"TDMA Forum, Implementation Guide: Non–Public Mode Operation and Selection in IS–136 Complaint Mobile Stations", Version 2.0, Mar. 9, 1995.

"TDMA Forum, Implementation Guide: Short Message Terminals Compliant With IS–136 and IS–137" (Ed. D. Holmes, vers. 7.0, Apr. 20, 1995).

"Der Short Message Service–Ein Neuer Dienst der Digitalen Mobilkommunikation" Heintz et al., pp. 517–526, Sep. 1993.

*Primary Examiner*—Dwayne Bost
*Assistant Examiner*—William G. Trost
*Attorney, Agent, or Firm*—Perman & Green, LLP

[57] ABSTRACT

A cellular radiotelephone (10) includes a keypad (22) having a plurality of keys (22a, 22b) and a display device (20) for displaying information, including messages, to a user. A method includes the steps of: (a) transmitting a short message service (SMS) message from a network (32) to the cellular radiotelephone; (b) receiving the SMS message from the network and storing the message in a memory (24) of the cellular radiotelephone; (c) presenting the stored SMS message to a user; (d) determining if the presented SMS message requires a manual acknowledgment by the user and, if so, monitoring an output of the keypad to detect a single key depression by the user. The method further includes a step of (e) determining if the user's single key depression is a correct manual acknowledgement and, if so, automatically generating and transmitting to the network a SMS manual acknowledgement message that includes an identification of the single key depressed by the user.

14 Claims, 3 Drawing Sheets

MOBILE TERMINAL HAVING ONE KEY USER MESSAGE ACKNOWLEDGMENT FUNCTION

FIELD OF THE INVENTION

This invention relates generally to radiotelephones and, in particular, to mobile terminals such as those capable of operation with a cellular network.

BACKGROUND OF THE INVENTION

The so-called Short Message Service (SMS) is a service which enables a user to send messages to and receive text messages from other users of a communications (cellular) network. The SMS attempts to deliver a message to a mobile terminal whenever the terminal is registered to the network, even when the terminal is engaged in a voice or data call. The terminal may also roam throughout the network and still be capable of sending and receiving messages. A terminal configured for SMS provides methods for the user to receive, read, write/edit, clear, send, and save messages. The connection of a standard keyboard to the terminal faciliates the generation and editing of text messages by the user.

The network stores messages in at least one Message Center (MC), and Mobile Terminated (MT) messages are sent to the terminal by an MC. Various SMS protocol layers receive the messages and check their contents. If the contents are valid, and assuming that there is room for incoming text messages in the memory of the terminal, the message is received and stored. Otherwise, the message is rejected.

U.S. Pat. No. 4,644,351 (Zabarsky et al.) discloses a paging system that enables messages to be sent to a remote unit, and which has a capability for the remote unit to transmit a message-received acknowledgement signal back to a central site. The paging system of Zabarsky et al. also enables a message-presented verification to be transmitted from an addressed pager back to the central site.

Reference can be had to the TIA Interim Standards IS-136 and IS-137, and also to a document entitled "TDMA Forum, Implementation Guide: Short Message Terminals Compliant With IS-136 and IS-137" (Ed. D. Holmes, vers. 7.0, Apr. 20, 1995). These documents specify one type of SMS and the various system and terminal level protocols required to provide SMS. This latter document describes in sections 3.2.1 and 3.2.2 a Delivery Acknowledgement and a Manual Acknowledgement capability, respectively. By example, a message "Can you meet me this evening? <NTC>Yes<NTC>No", where NTC is a non-text character, is said would allow the user to select a response from "Yes" or "No", and consequently cause the terminal to send response codes 0 or 1. However, the indication and selection of these responses is undefined.

As may be appreciated, it is desirable to provide an efficient and simple user interface when employing SMS in a mobile terminal. In particular, it is desirable to provide the user with an efficient and simple mechanism to respond to a SMS message that requires a response from the user.

OBJECTS OF THE INVENTION

It is thus a first object of this invention to provide an efficient and simple technique for enabling a user of a mobile terminal to respond to a message that requires a response from the user.

It is a second object of this invention to provide a mobile terminal having SMS capability, and that furthermore provides a SMS user interface that enables a user to respond with a single keystroke to a message that requires a manual acknowledgement from the user.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to a network through an RF interface. The cellular radiotelephone includes a keypad having a plurality of keys and a display device for displaying information, including messages, to a user. The method includes the steps of: (a) transmitting a short message service (SMS) message from the network to the cellular radiotelephone; (b) receiving the SMS message from the network and storing the message in a memory of the cellular radiotelephone; (c) presenting the stored SMS message to a user; (d) determining if the presented SMS message requires a manual acknowledgment by the user and, if so, monitoring an output of the keypad to detect a single key depression by the user. The method further includes a step of (e) determining if the user's single key depression is a correct manual acknowledgement and, if so, formatting and transmitting to the network a SMS manual acknowledgement message that includes an identification of the single key depressed by the user.

If the step of monitoring detects that the user indicates that a next stored message is to be presented, before the currently presented message is acknowledged, the method includes a further step of inhibiting a presentation of a next SMS message.

If the step of monitoring detects that the user indicates that a currently presented SMS message is to be erased, before the currently presented SMS message is acknowledged, the method includes a further step of erasing the currently presented SMS message without formatting and transmitting to the network a SMS manual acknowledgement message.

If the step of monitoring detects that the user indicates that the presentation of stored SMS messages is to be terminated, before the currently presented SMS message is acknowledged, the method includes a further step of terminating the presentation of SMS messages, including the currently presented SMS message, without formatting and transmitting to the network a SMS manual acknowledgement message, and without erasing the currently presented SMS message from the memory.

The method includes a further step of displaying a message to the user for informing the user that the cellular radiotelephone has formatted and transmitted the acknowledgement message that includes the user's acknowledgement signal.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
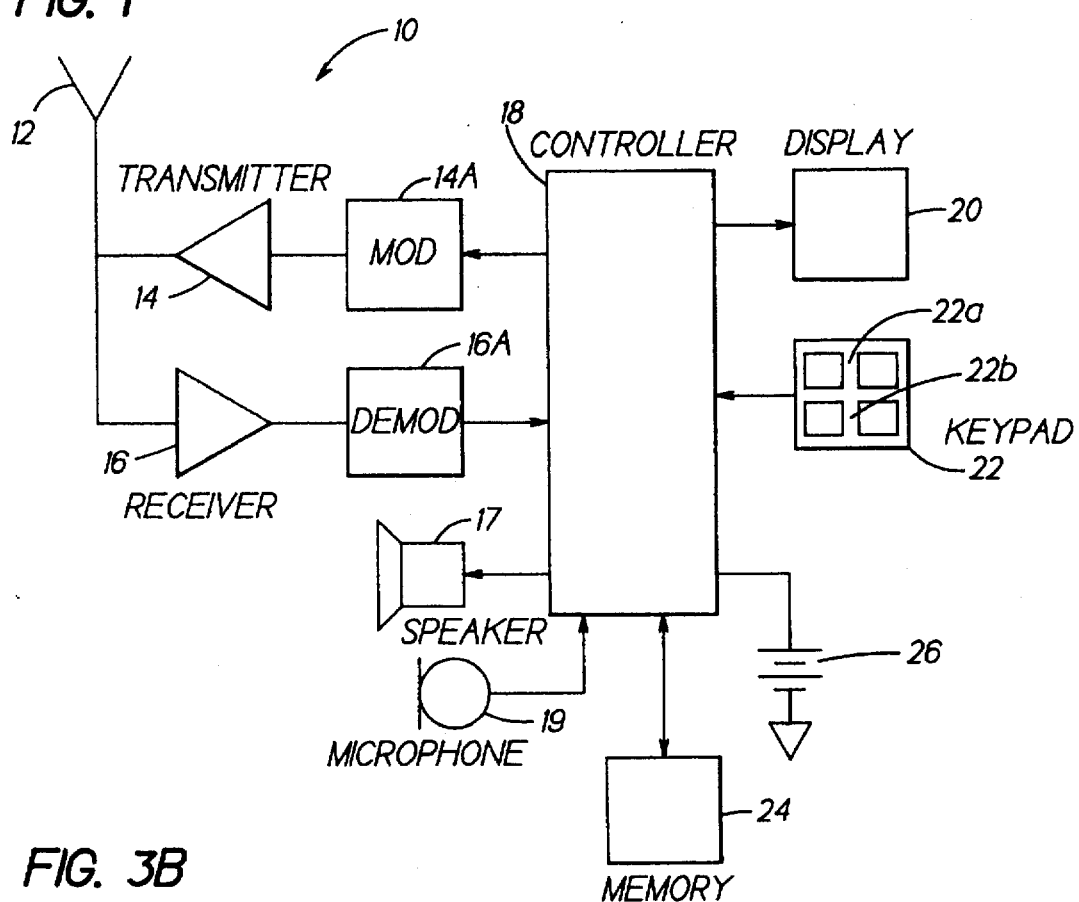
FIG. 1 is a block diagram of a mobile terminal that is constructed and operated in accordance with this invention.
Figure 2:
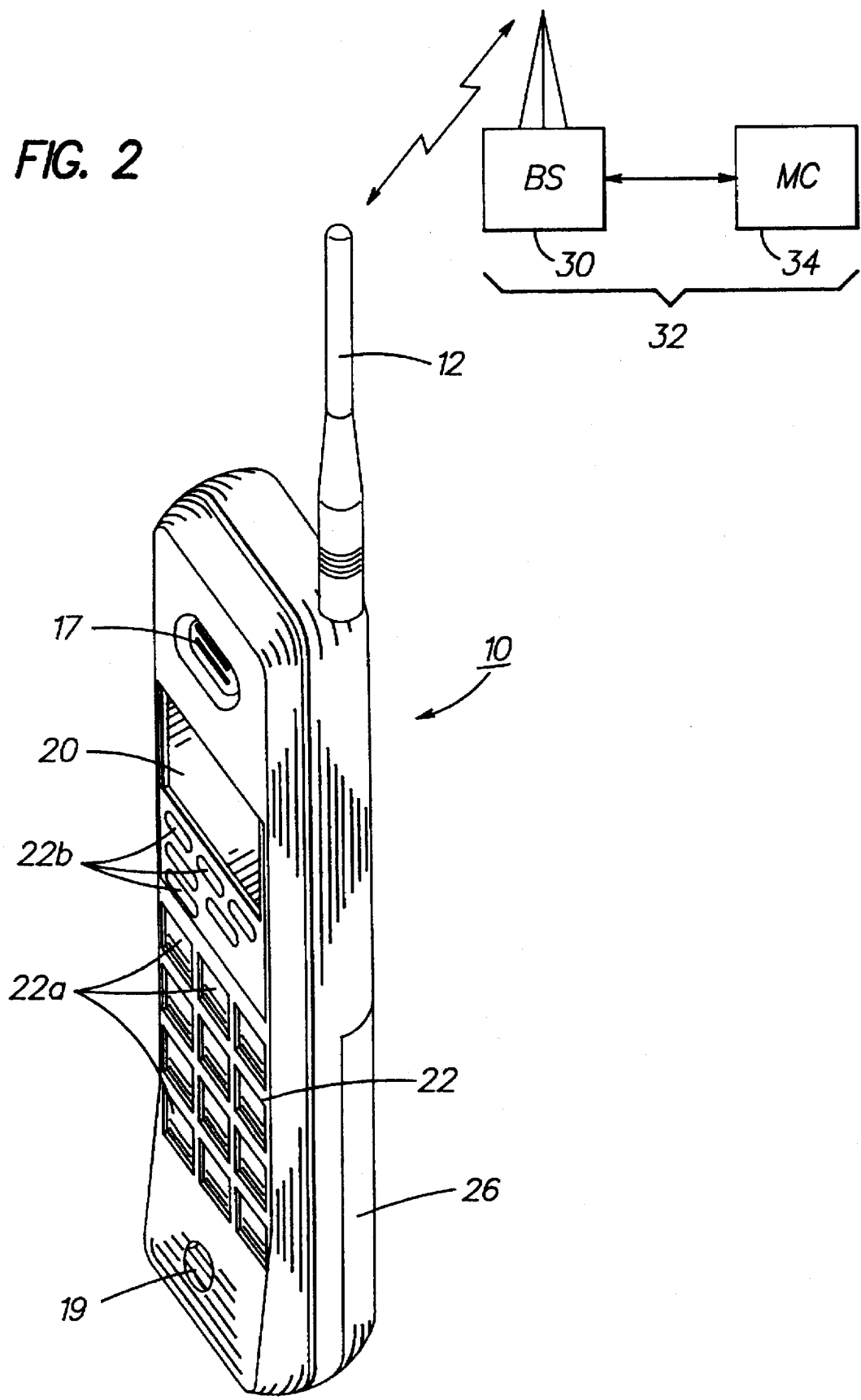
FIG. 2 is an elevational view of the mobile terminal shown in FIG. 1, and which further illustrates a cellular communication system to which the mobile terminal is bidirectionally coupled through wireless RF links.

Reference is made to FIGS. 1 and 2 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network 32 that includes a message center (MC) 34. The MC 34 stores and forwards messages to the user terminal 10 when the user terminal is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a SMS capability, and to further include a manual acknowledgement capability for certain of the SMS messages.

A user interface includes a conventional speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the mobile terminal 10. These other keys 22b include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user. The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as one known as EIA/TIA-553 (AMPS). The terminal may also be capable of operating with any of a number of other analog or digital standards, such as GSM, EIA/TIA 627 (DAMPS), IS-136 (DDAMPS), and IS-95 (CDMA). Narrow-band AMPS (NAMPS), as well as TACS, mobile terminals may also benefit from the teaching of this invention. In general, the teaching of this invention applies to any radiotelephone or pager user terminal that is capable of receiving a message from a system, that includes a display for displaying the message to a user, and that furthermore includes a user input device, such as a keypad, with which the user can manually acknowledge the receipt of or otherwise respond to the message. It should thus be clear that the teaching of this invention is not to be construed to be limited to any one particular type of mobile-terminal or air interface standard.

The operating program in the memory 24 includes routines to present messages and message-related functions to the user on the display 20, typically as various menu items. The memory 24 also includes routines for implementing the method described below in relation to FIGS. 3A and 3B.

Figure 3B:
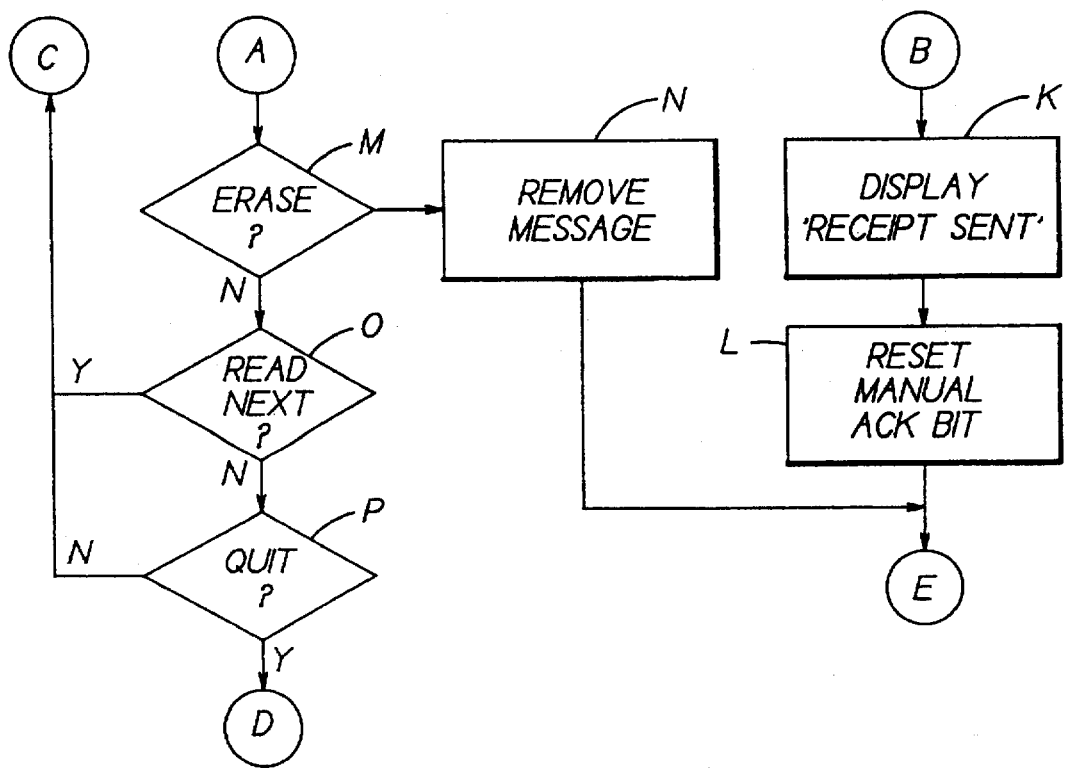
FIGS. 3A and 3B are a logic flow diagram that illustrate a method executed by the mobile terminal shown in FIGS. 1 and 2.
Figure 3A:
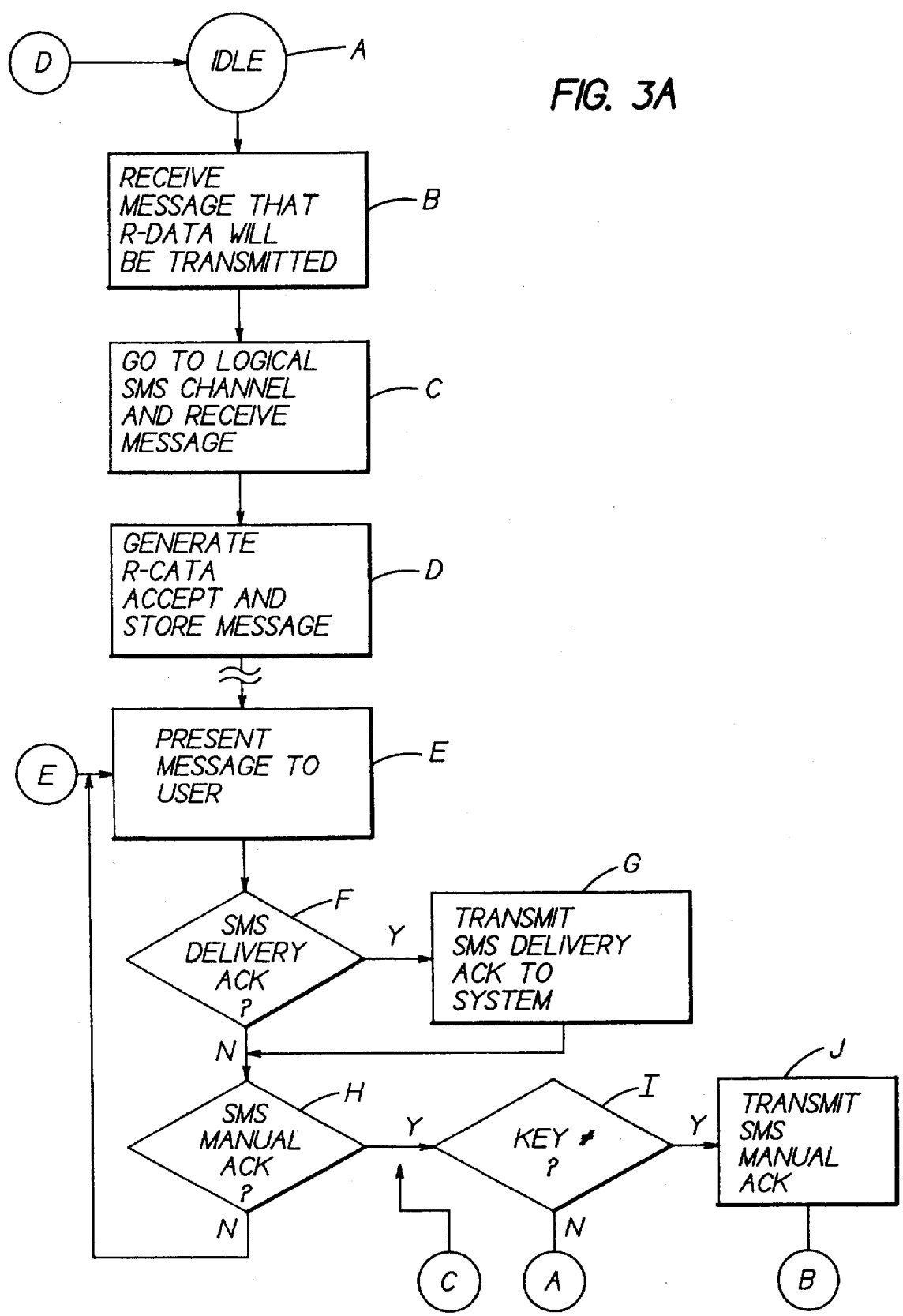

Reference is now made to FIGS. 3A and 3B for illustrating a method in accordance with this invention. The method will be described in the context of one existing interim cellular digital standard (i.e., IS-136) that provides a Short Message Service (SMS) capability, although the teaching of this invention is not limited for use only with this one particular interim standard.

At Block A the mobile terminal 10 is considered to be in a SMS idle state (although the mobile terminal 10 may be actively transceiving voice and/or data with one or more of the base stations 30). At Block B the mobile terminal 10 receives a message from the network 32 that data, such as R-data as specified by IS-136, will be transmitted. At Block C the mobile terminal goes to a logical SMS channel and receives the R-data message. At Block D the mobile terminal 10 generates and transmits an R-data accept message back to the system, assuming that the data was correctly received, and also stores the received message in the memory 24, assuming that there is room in the memory 24 to store the message. Sometime later the user enters a menu function and by one or more key depressions on the keypad 22 requests that any stored messages be presented on the display 20. At Block E the mobile terminal 10 presents a first stored message to the user on the display 20. At Block F a determination is made if the message has an SMS delivery acknowledgement (ACK) bit set. If Yes, control passes to Block G where the mobile terminal 10 automatically generates and transmits a SMS delivery acknowledgement to the network. By example, section 7.2.3 of IS-136 specifies one suitable format for the SMS delivery acknowledgement message. After transmitting the SMS delivery acknowledgement message to the network 32, or if No at Block F, control passes to Block H to determine if the message has an SMS manual acknowledgement bit set. If No, control may pass back to Block E to present, if available, a next message to the user. If no further messages are stored in the memory 24, control passes back to the idle state at Block A.

The SMS manual acknowledgement bit being set in the message implies that the sender of the message desires a response from the recipient of the message. By example, the message text may be the question "Can We Meet For Lunch On Tuesday?", followed by "1=yes 2=no". To respond to this message the user should depress the "1" key on the keypad 22 or the "2" on the keypad 22. The user's response, or acknowledgement signal, is then transmitted back to the network 32 and the MC 34 for eventual delivery to the original sender of the message.

In accordance with an aspect of this invention, and referring to Block I, the mobile terminal 10 monitors the output of the keypad 22 to determine if the user has depressed a numeric key (0–9). If Yes, control passes to Block J so as to transmit the SMS manual acknowledgement message, including the identity of the numeric key that was depressed by the user, back to the network 34. One suitable format for the SMS manual acknowledgement message is set forth in section 7.2.4 of IS-136.

In accordance with this aspect of the invention the user need take no other action to respond to the message requiring a manual acknowledgement, other than to depress one of the specified keys (or actually any key in a predetermined set of allowable keys (e.g., numeric keys)). When the user depresses one of the specified keys the mobile terminal 10 functions to automatically generate and compose the required SMS manual acknowledgement message and to transmit same to the network 34 without further involvement of the user.

Having transmitted the SMS manual acknowledgement message at Block J, control passes to Block K where the mobile terminal 10 may display an appropriate message to the user, such as "Message Acknowledged to Sender". Control then passes to Block L to reset (logically) the manual acknowledgement bit, thereby exiting the manual acknowledgement mode of operation, followed by a return to Block E to present a next message to the user.

If the user does not depress one of the predetermined numeric keys at Block I, control passes to Block M to determine if the user has pressed a key that indicates that the displayed message is to be erased. If Yes at Block M, control passes to Block N to remove the message from the memory 24, after which control passes to Block E. If No at Block M, control passes to Block O to determine if the user has pressed a key to indicate a Read Next menu function. In this context, and in that the presently displayed message requires that the message be manually acknowledged, the user's Read Next indication is ignored and control passes back to Block I to wait for the user to enter one of the predetermined numeric keys. A message can be displayed to the user to indicate that the Read Next command was not accepted (e.g., a message such as "The Current Message Requires Your Acknowledgement"). If No at Block O control passes to Block P to determine if the user has depressed a key to indicate that the user wishes to Quit the presentation of stored messages. If No at Block P, control passes back to Block I to wait for the user to acknowledge the currently displayed message. Although not shown in FIG. 3B, a depression of any other non-allowed or non-expected key will also result in control passing back to Block I. If Yes at Block P, control passes through connector D back to the idle state at Block A. In this case, the message requiring a manual acknowledgement from the user is still stored in the memory 24, and will thus be displayed again to the user the next time that the user indicates that stored messages are to be presented on the display 20.

Although described in the context of a message that required one of two responses (i.e., yes/no), more complex messages that require one of more than two responses can be accommodated by the teaching of this invention.

Furthermore, although described in the context of a mobile terminal having a keypad for receiving input from a user, it is within the scope of this invention to employ any suitable type of user input interface. By example, if the mobile terminal is connected to a computer, the message can be output via a cable or an IR link and displayed on the computer's screen, and the computer's keyboard can be employed for generating the user acknowledgement. Alternatively, a suitable mobile terminal or computer voice recognition system can be employed for generating the user's acknowledgement signal.

Furthermore, and as was indicated previously, the teaching of this invention is not limited for use with any one particular type of message delivery/response protocol (such as the one specified by IS-136).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a cellular radiotelephone of a type that is bidirectionally coupled to a network through an RF interface, said cellular radiotelephone comprising a keypad having a plurality of keys and a display device for displaying information, including messages, to a user, comprising the steps of:

transmitting a short message service (SMS) message from the network to the cellular radiotelephone;

receiving the SMS message from the network and storing the message in a memory of the cellular radiotelephone;

presenting the stored SMS message to a user;

determining if the presented SMS message requires a manual acknowledgment by the user and, if so, monitoring an output of the keypad to detect a single key depression by the user; and determining if the user's single key depression is a valid manual acknowledgement and, if so, generating and transmitting to the network a SMS manual acknowledgement message that includes an identification of the single key depressed by the user.

2. A method as set forth in claim 1, wherein if the step of monitoring detects that the user indicates that a next stored message is to be presented, before the currently presented message is acknowledged, the method includes a further step of inhibiting a presentation of a next SMS message.

3. A method as set forth in claim 1, wherein if the step of monitoring detects that the user indicates that a currently presented SMS message is to be erased, before the currently presented SMS message is acknowledged, the method includes a further step of erasing the currently presented SMS message without formatting and transmitting to the network a SMS manual acknowledgement message.

4. A method as set forth in claim 1, wherein if the step of monitoring detects that the user indicates that the presentation of stored SMS messages is to be terminated, before the currently presented SMS message is acknowledged, the method includes a further step of terminating the presentation of SMS messages, including the currently presented SMS message, without formatting and transmitting to the network a SMS manual acknowledgement message, and without erasing the currently presented SMS message from the memory.

5. A method as set forth in claim 1, and further comprising a step of displaying a message to the user for informing the user that the cellular radiotelephone has formatted and transmitted the acknowledgement message that includes the user's acknowledgement signal.

6. A method for operating a cellular radiotelephone of a type that is bidirectionally coupled to a network through an RF interface, said cellular radiotelephone comprising a keypad having a plurality of keys and a display device for displaying information, including messages, to a user, comprising the steps of:

transmitting a short message service (SMS) message from the network to the cellular radiotelephone;

receiving the SMS message from the network and storing the message in a memory of the cellular radiotelephone;

presenting the stored SMS message to a user;

determining if the presented SMS message requires a manual acknowledgment by the user and, if so, monitoring an output of the keypad to detect a single key depression by the user; and determining if the user's single key depression is a depression of one of a predetermined set of keys and, if so, generating and transmitting to the network a SMS manual acknowledgement message that includes an identification of the single key depressed by the user.

7. A method as set forth in claim 6, wherein if the step of monitoring detects that the user indicates that a next stored message is to be presented, before the currently presented message is acknowledged, the method includes a further step of inhibiting a presentation of a next SMS message.

8. A method as set forth in claim 6, wherein if the step of monitoring detects that the user indicates that a currently presented SMS message is to be erased, before the currently presented SMS message is acknowledged, the method includes a further step of erasing the currently presented SMS message without formatting and transmitting to the network a SMS manual acknowledgement message.

9. A method as set forth in claim 6, wherein if the step of monitoring detects that the user indicates that the presentation of stored SMS messages is to be terminated, before the currently presented SMS message is acknowledged, the method includes a further step of terminating the presentation of SMS messages, including the currently presented SMS message, without formatting and transmitting to the network a SMS manual acknowledgement message, and without erasing the currently presented SMS message from the memory.

10. A method as set forth in claim 6, and further comprising a step of displaying a message to the user for informing the user that the cellular radiotelephone has formatted and transmitted the acknowledgement message that includes the user's acknowledgement signal.

11. A radiotelephone, comprising:

a transceiver for bidirectionally coupling said radiotelephone to a telecommunications network through an RF interface;

a user interface comprising a display and a plurality of user activated data entry keys;

a memory; and a controller coupled to said transceiver, said user interface, and to said memory, said controller operating under the control of a stored program and being responsive to a receipt of a short message service (SMS) message from the telecommunications network for storing the received SMS message in said memory and for presenting the stored SMS message to a user through said display, said controller further operating under the control of said stored program to determine if the presented SMS message requires a manual acknowledgment by the user and, if so, for monitoring an output of said user interface to detect an activation of a single data entry key by the user, said controller further operating under the control of said stored program to determine if the user's single data entry key activation is an activation of one of a predetermined set of data entry keys and, if so, for generating and outputting to the transceiver a SMS manual acknowledgement message for transmission to the telecommunications network, said generated SMS manual acknowledgment message including an identification of the single data entry key that was activated by the user.

12. A radiotelephone as set forth in claim 11, wherein said user interface is an integral part of said radiotelephone.

13. A radiotelephone as set forth in claim 11, wherein at least a portion of said user interface is disposed outside of said radiotelephone.

14. A radiotelephone as set forth in claim 11, wherein individual ones of said plurality of data entry keys are activated by a user's voice command.

\* \* \* \* \*